US009009946B2

(12) United States Patent
Steger (10) Patent No.: US 9,009,946 B2
(45) Date of Patent: Apr. 21, 2015

(54) MACHINING APPARATUS FOR GRINDING, MILLING, POLISHING OR THE LIKE OF A DENTAL WORKPIECE

(71) Applicant: Heinrich Steger, Bruneck (IT)

(72) Inventor: Heinrich Steger, Bruneck (IT)

( * ) Notice: Subject to any disclaimer, the term of this patent is extended or adjusted under 35 U.S.C. 154(b) by 176 days.

(21) Appl. No.: 13/753,764

(22) Filed: Jan. 30, 2013

(65) Prior Publication Data

US 2013/0192059 A1  Aug. 1, 2013

(30) Foreign Application Priority Data

Jan. 30, 2012  (AT) .................................. A 118/2012

(51) Int. Cl.
| | |
|---|---|
| *B23C 3/12* | (2006.01) |
| *B23Q 11/04* | (2006.01) |
| *B24B 41/04* | (2006.01) |
| *B23Q 1/70* | (2006.01) |
| *B23B 31/08* | (2006.01) |
| *B23Q 17/22* | (2006.01) |

(52) U.S. Cl.
CPC . *B23Q 1/70* (2013.01); *B23B 31/08* (2013.01); *B23C 3/12* (2013.01); *B24B 41/04* (2013.01); *B23Q 11/04* (2013.01); *B23Q 17/22* (2013.01); Y10S 901/45 (2013.01)

(58) Field of Classification Search
USPC ......... 409/138, 140, 139, 180, 143, 231, 232, 409/201, 211, 216; 901/45; 408/127, 236; 29/560, 26 R, 26 A; 451/343
See application file for complete search history.

(56) References Cited

U.S. PATENT DOCUMENTS

| | | | |
|---|---|---|---|
| 1,782,633 A | 11/1930 | Schiltz | |
| 4,153,993 A | 5/1979 | Kataoka et al. | |
| 4,320,927 A | 3/1982 | Sertich | |
| 4,332,066 A * | 6/1982 | Hailey et al. .................. 29/26 R |
| 4,637,775 A * | 1/1987 | Kato .............................. 409/138 |
| 4,800,802 A * | 1/1989 | Rebman .......................... 901/45 |
| 4,836,722 A * | 6/1989 | Kurita et al. .................. 409/132 |
| 4,860,500 A * | 8/1989 | Thompson ...................... 451/11 |
| 4,884,941 A * | 12/1989 | Kazerooni ...................... 901/41 |
| 5,312,212 A * | 5/1994 | Naumec ........................ 409/138 |
| 5,765,975 A * | 6/1998 | Hoffmann et al. ............ 409/138 |
| 6,974,286 B2 * | 12/2005 | Lawson ........................ 409/140 |
| 7,137,763 B2 * | 11/2006 | Lawson ........................ 409/140 |
| 7,140,880 B2 | 11/2006 | Kuhn | |
| 7,396,197 B2 * | 7/2008 | Lawson ........................ 409/138 |
| 7,717,653 B2 * | 5/2010 | Miyata et al. ................. 408/127 |

FOREIGN PATENT DOCUMENTS

| | | |
|---|---|---|
| DE | 2802712 A1 | 7/1978 |
| DE | 10354474 A1 | 6/2005 |
| DE | 102007001620 A1 | 7/2008 |

(Continued)

*Primary Examiner* — Erica E Cadugan
(74) *Attorney, Agent, or Firm* — Laurence A. Greenberg; Werner H. Stemer; Ralph E. Locher (57) ABSTRACT

A machining apparatus for grinding, milling, polishing or the like of a dental workpiece. The machining apparatus contains a machining tool, a housing to which the machining tool is mounted rotatably about an axis of rotation relative to the housing, and a holding device to which the housing is fixed. The housing is mounted yieldingly movably to the holding device in dependence on forces exerted on the machining tool.

16 Claims, 7 Drawing Sheets

(56) References Cited

FOREIGN PATENT DOCUMENTS

| | | | |
|---|---|---|---|
| DE | 102010008998 A1 | | 8/2011 |
| EP | 249722 A1 | * | 12/1987 |
| EP | 421917 A1 | * | 4/1991 |
| JP | 60-131106 A | * | 7/1985 |
| JP | 64-002811 A | * | 1/1989 |
| WO | 03020150 A1 | | 3/2003 |

* cited by examiner

MACHINING APPARATUS FOR GRINDING, MILLING, POLISHING OR THE LIKE OF A DENTAL WORKPIECE

CROSS-REFERENCE TO RELATED APPLICATION

This application claims the priority, under 35 U.S.C. §119 (b), of Austrian Patent Application No. AT A118/2012 filed Jan. 30, 2012; the prior application is herewith incorporated by reference in its entirety.

BACKGROUND OF THE INVENTION

Field of the Invention

The invention concerns a machining apparatus for grinding, milling, polishing or the like of a dental workpiece, containing a machining tool, a housing to which the machining tool is mounted rotatably about an axis of rotation relative to the housing, and a holding device to which the housing is fixed. In addition the invention concerns a CAD-CAM machine for machining dental workpieces having a machining apparatus according to the invention.

To grind or mill dental models, various machining apparatuses have already long been known in dental technology, which generally fully automatically machine the workpiece appropriately in dependence on a control or regulating unit. In most cases such machining apparatuses are arranged on cross members of a CAD-CAM machine (computer-aided design and computer-aided manufacturing) and are movable by way thereof in the X-, Y- and Z-direction relative to the workpiece. It will be appreciated that the workpiece can also be moved relative to the machining apparatus.

Problems with those previously known machining apparatuses can occur when incorrect operating procedures are employed, defects in one of the parts of the machining apparatuses occur or the workpiece has locations of differing density. An incorrect grinding or milling operation can be unintentionally performed if the position of the machining apparatus relative to the workpiece is not right or if too much pressure is exerted on the workpiece.

SUMMARY OF THE INVENTION

It is accordingly an object of the invention to provide a machining apparatus for grinding, milling, polishing or the like of a dental workpiece which overcomes the above-mentioned disadvantages of the prior art devices of this general type, which prevents destruction or unwanted grinding or milling of the workpiece by the machining apparatus.

With the foregoing and other objects in view there is provided, in accordance with the invention a machining apparatus for grinding, milling, or polishing of a dental workpiece. The machining apparatus containing a machining tool, a housing mounting the machining tool, the machine tool mounted rotatably about an axis of rotation relative to the housing, and a holding device fixing the housing. The housing mounted yieldingly movably to the holding device in dependence on forces exerted on the machining tool.

The machining apparatus has a housing that is mounted yieldingly movably to the holding device in dependence on forces exerted on the machining tool or head. The basic idea therefore is that the machining apparatus is not stiff as in the case of conventional milling or grinding machines but is mounted yieldingly, that is to say movably to the holding device.

It can preferably be provided, for such a holding device, that it has a holding frame for the housing and a base element to which the holding frame is mounted. In that case the holding frame can have a front holding plate, a rear holding plate and a carrier plate to which the two holding plates are fixed.

If an excessively high pressure is exerted by the workpiece inter alia in the axial direction on the machining tool then the housing together with the machining apparatus preferably yields at least in the axial direction. That is achieved in that the housing is mounted movably with respect to the holding device substantially in the direction of the axis of rotation. It is particularly preferably provided for that purpose that the holding frame together with the housing is mounted movably in the direction of the axis of rotation with respect to the base element damped by a damping element. Thus the damping element forms so-to-speak a return element, wherein the housing together with the holding frame is moved into the starting position again by the relief of the axial pressure on the machining head or machining tool. That damping element can be operated pneumatically, electrically, mechanically or hydraulically. Preferably that damping element has a spring.

Alternatively or additionally to the axial yielding mobility of the housing together with the machining tool it can be provided that pivotal movement of the housing when pressure is applied to the machining head, differently from the axial direction, is also made possible. Preferably in the event of an excessively high pressure the housing together with the machining head can be pivoted not only about an axis, but can tilt through a certain number of degrees in all directions. For that purpose it is preferably provided that the housing is mounted movably with respect to the holding device about a pivot point—preferably by a ball joint. In other words the housing is mounted pivotably not only about a pivot axis in only one direction relative to the holding device or on the holding frame, but can be tilted about a pivot point in all directions. In that way the machining tool or head can yield under pressure from the most widely varying and preferably all directions.

In order not to allow excessive outward pivotal or rotary movements it is preferably provided that the housing is mounted limitedly rotatably by way of the ball joint in the holding frame of the holding apparatus, preferably in the front holding plate thereof. Specifically for such a machining apparatus it can be provided that the ball joint has an outer ring arranged in the holding frame of the holding device, preferably in the front holding plate thereof, and an inner ring arranged on the housing, which rings have mutually corresponding ball surface portions.

Preferably with such a return device it is provided that when no axial force is exerted on the machining head the machining head is rotatable together with the housing about the pivot point whereby the housing is movable from the central position into an inclined position against the force of the return device and when the machining tool is unloaded the housing remains in the central position or is movable into the central position by the return device. In that respect no axial application of pressure means that force acts on the machining head from the workpiece (or also from another part of a machine) in a direction which is different from the axis of rotation.

To guarantee that the housing together with the machining head is returned to the starting position after having tilted away in the situation involving non-axial overloading, it is preferably provided that the housing is mounted movably in the holding frame, preferably in the rear holding plate thereof, by way of a preferably magnetic return device. Instead of a magnetic return device with permanent magnets it is also possible to install springs which always push or pull the housing into the starting position. Instead of permanent magnets it is also possible to use electromagnetic, mechanical, hydraulic and/or pneumatic actuators. The return movement can also be implemented hydraulically or pneumatically (for example by way of pressure pistons). The starting position can also be restored again by way of resilient elements or elastically deformable materials (for example rubber buffers). The force of the return device—and thus the force as from which displacement of the housing is triggered—is adjustable.

Basically the machining apparatus can have pneumatic or hydraulic drives of different kinds. A drive can also be provided by a turbine. It is preferably provided however that an electric motor for driving the machining head is arranged at or in the housing. It is also possible for the drive of the machining apparatus to be effected 'from outside', for example by a belt drive.

To ascertain the exact inclination and/or axial displacement of the housing it can be provided that at least one measuring sensor for measuring the position and preferably the axis inclination of the housing relative to the holding frame is arranged in the housing and/or outside and/or in the holding frame. The displacement or inclination of the housing in all directions can be ascertained by one or more such measuring sensors. The measuring sensor can be arranged for example in the holding frame and can for example inductively, capacitively or optically determine the spacing relative to a certain region of the housing and can thereby infer the inclined positioning. The measurement results can then be passed to an overall control or regulating unit. Different control programs can then be executed in dependence on those measurement results, whereby the machining apparatus is moved away again from that inclined position or axial displacement caused by overloading, by the CAD-CAM machine, to such an extent that the machining head is again in the central position. The movement of the machining apparatus can also be regulated or controlled by the CAD-CAM machine in such a way that a higher machining force is intentionally achieved by a greater deflection.

Other features which are considered as characteristic for the invention are set forth in the appended claims.

Although the invention is illustrated and described herein as embodied in a machining apparatus for grinding, milling, polishing or the like of a dental workpiece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
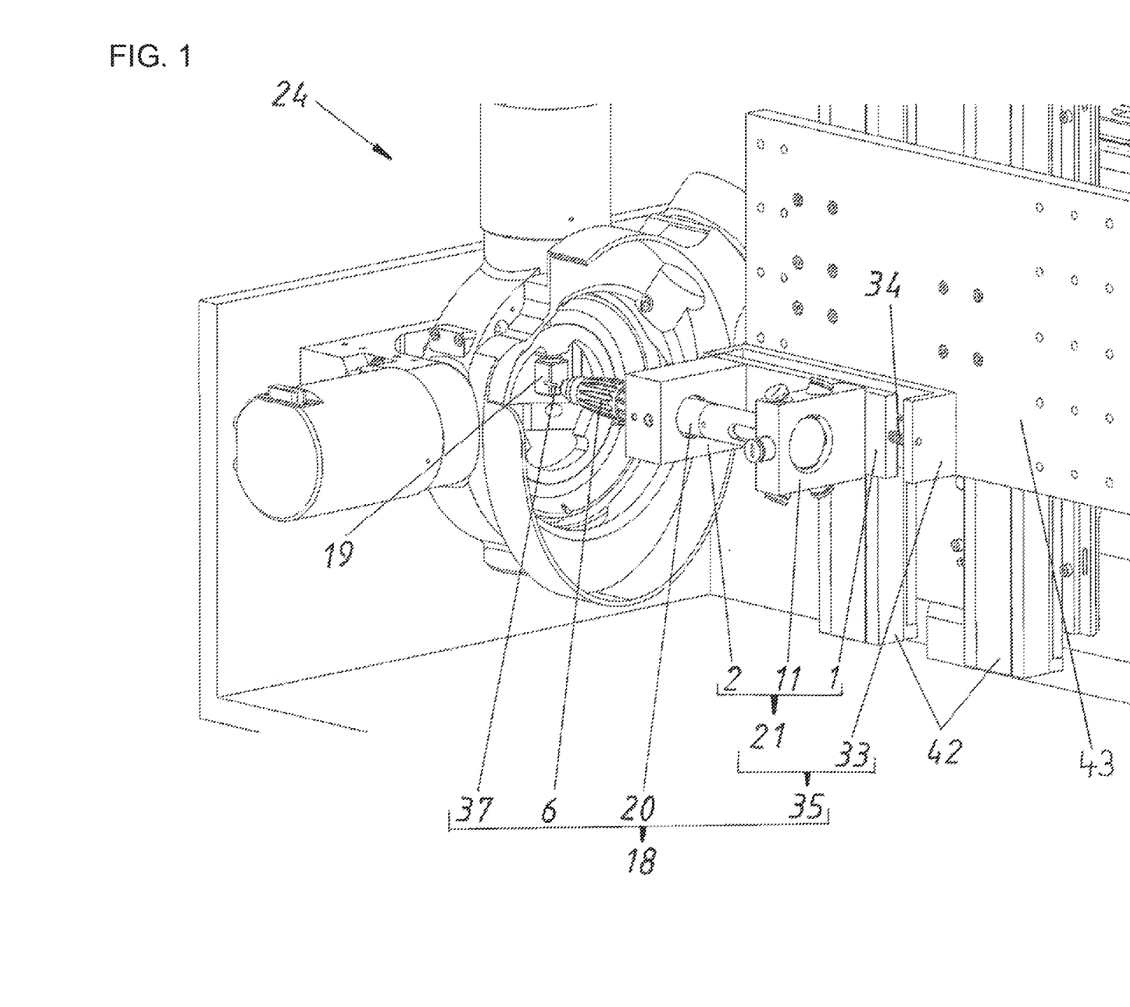
FIG. 1 is a diagrammatic, perspective view of a CAD-CAM machine together with a machining apparatus.

Referring now to the figures of the drawing in detail and first, particularly, to FIG. 1 thereof, there is shown a structure of a CAD-CAM machine 24 with cross members 42 and a base plate 43 mounted on the cross members 42. A machining apparatus 18 is in turn fixed on that base plate 43. The machining apparatus 18 substantially contains a machining head 6 with a machining tool 37 (drilling, grinding, milling or like tool), a housing 20 and a holding device 35. The holding device 35 in turn has a holding frame 21 (containing a front holding plate 2, a rear holding plate 11 and a carrier plate 1), as well as a base element 33. The entire machining apparatus 18 is fixed by way of the base element 33 to the base plate 43 of the CAD-CAM machine 24. A workpiece 19 is held in a per se known device and is preferably automatically machined by way of the machining tool 37 mounted at the tip of the machining head 6, in dependence on a non-illustrated control or regulating unit.

Figure 2:
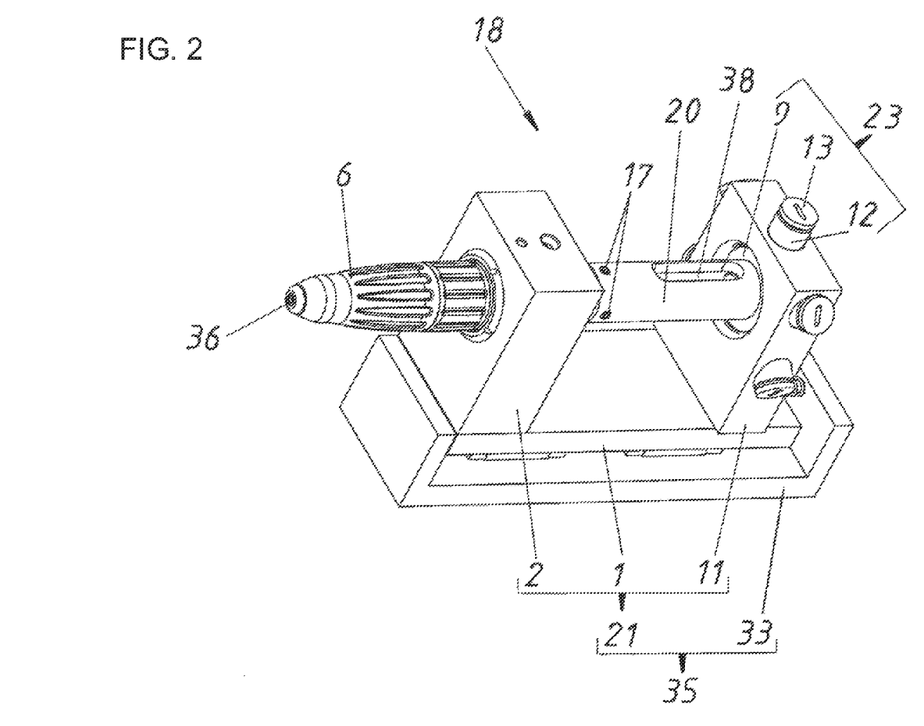
FIG. 2 is a diagrammatic, perspective view of the machining apparatus.

FIG. 2 shows the machining apparatus 18 with a fixing device 36 for the machining tool 37, which fixing device can be seen at the tip of the machining head 6. The housing 20 is yieldingly movably mounted in the rear holding plate 11 by way of a return device 23. The return device 23 has a centering element 9 fixed to the housing 20 and magnetic sleeves 12 arranged in the rear holding plate 11 together with closure caps 13. Provided in the housing 20 is a slot 38 by way of which a cable passes power to a drive motor in the machining head 6 for rotating the machining tool 37.

Figure 3:
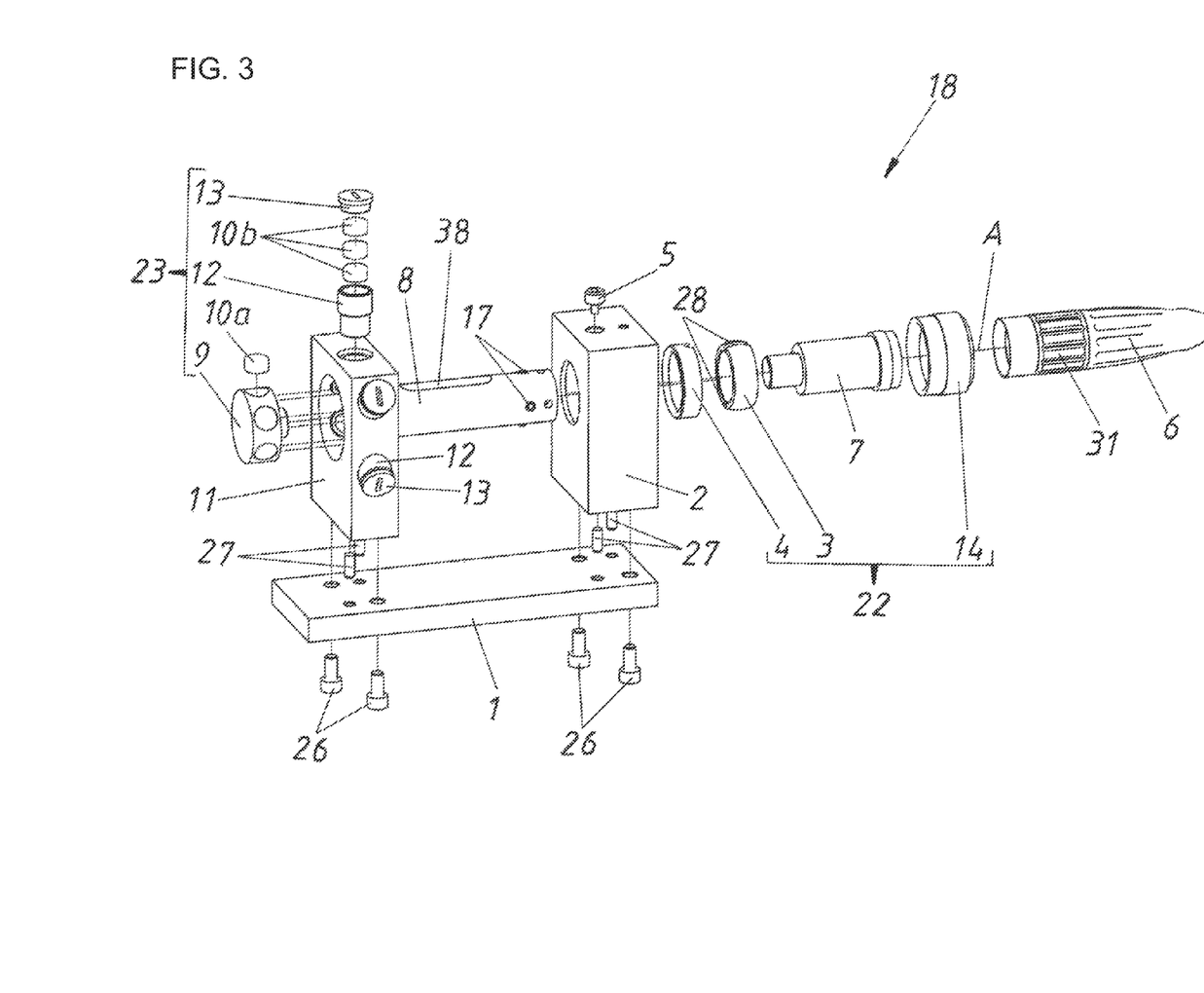
FIG. 3 is a diagrammatic, exploded perspective view of the machining apparatus.

FIG. 3 shows an exploded view of the machining apparatus 18. In a rear region the machining head 6 has a drive element 31, by which the machining tool 37 (also referred to as the spindle) is drivable in rotation. The machining head 6 is part of the housing 20 and is fixed on a receiving shaft 7 of the housing 20. An inner ring 3 provided with two grooves 28 is fixedly mounted on that shaft 7. The inner ring 3 of a ball joint 22 is held rotatably about the pivot point P in the front holding plate 2 by way of the two outer rings 4 and 14 which also form the ball joint 22. To ensure that the outer ring 14 does not come loose due to vibration or other influences it is radially slightly clamped in the front holding plate 2 with a grub screw 44 (see FIG. 4A). So that the machining head 6 cannot be rotated about the axis of rotation A of the machining tool 37, screwed into the front holding plate 2 are two rotation-preventing bolts 5 which engage into the grooves 28 in the inner ring from above and from below. An extension shaft 8 of the housing 20 is further also fixed on the receiving shaft 7. A centering element 9 in which there are disposed magnets 10a is then screwed on to the rear side. In that respect the entire return device 23 is so constructed that the centering element 9 with the permanent magnets 10a disposed therein is disposed precisely centrally between further magnets 10b disposed in the rear holding plate 11. Those permanent magnets 10b are introduced into magnetic sleeves 12 arranged uniformly around the centering element 9 and are braced into the magnetic sleeve 12 with a closure cap 13. The spacing relative to the magnets 10a disposed in the centering element 9 can be correctly set by way of a male thread on the magnetic sleeve 12. The two holding plates 2 and 11 are pinned on a carrier plate 1 by way of fixing pins 27 and are fixed by way of fixing screws 26. The extension shaft 8 is fixed on the receiving shaft 7 by way of hexagonal recess screws 17.

Figure 4A:
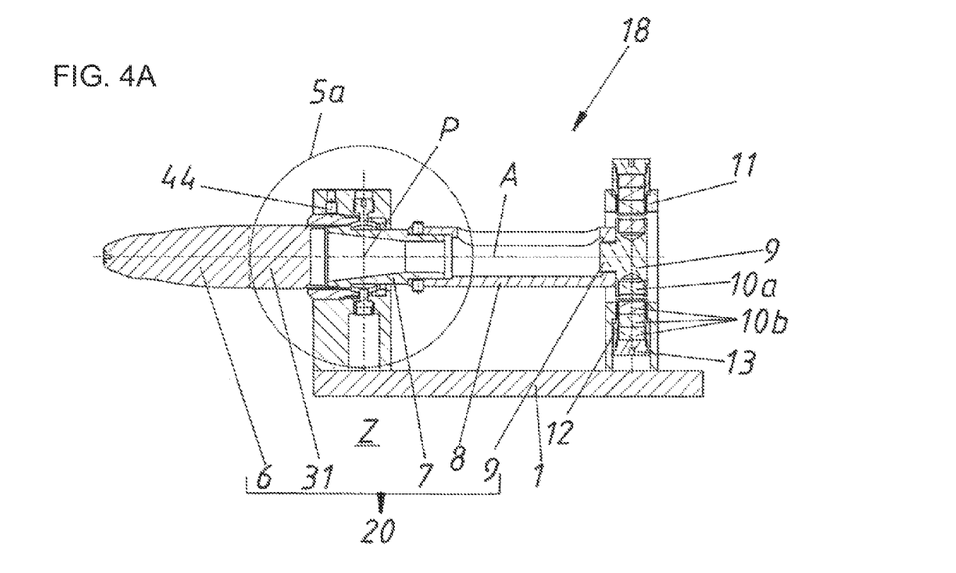
FIG. 4A is a diagrammatic, sectional view of the machining apparatus in a central position.

The section in FIG. 4A shows the housing 20 in a central position Z. In this case no pressure is exerted on the machining head 6 by way of the machining tool 37 (not shown) whereby the axis of rotation A is oriented parallel to the carrier plate 1. In addition the centering element 9 with its magnets 10a is in a central position and is repelled on all sides in the same fashion by the magnet 10b and is thus centered.

Figure 4B:
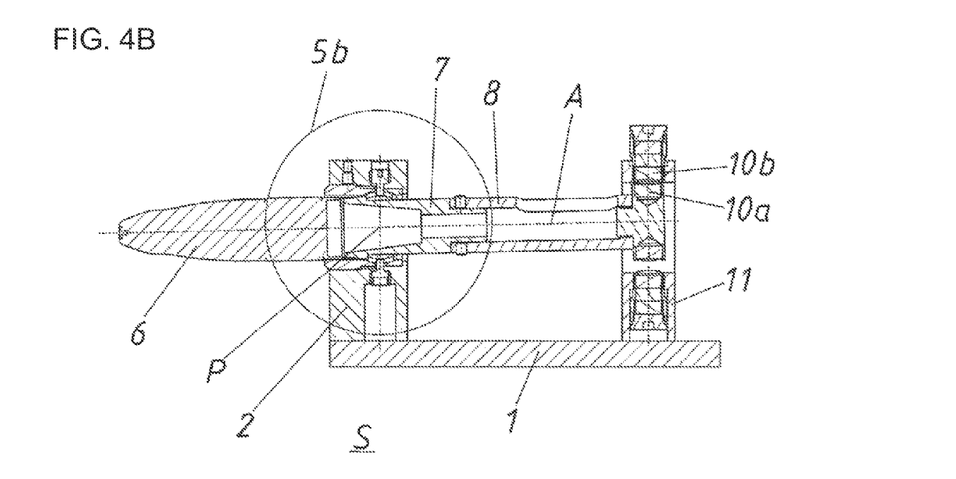
FIG. 4B is a diagrammatic, sectional view of the machining apparatus in an inclined position.

In comparison in FIG. 4B the housing 20 with the machining head 6 is in an inclined position, the housing 20 having moved about the pivot point P of the ball joint 22. By virtue of that rotary movement about the pivot point P which is fixed with respect to the holding frame, the return device 23 also moves out of its central position and the magnets 10a and 10b come closer together at one side. As soon as the pressure on the machining head 6 decreases the magnets 10a and 10b repel each other again and the centering element 9 with the entire housing 20 again moves into the central position Z in FIG. 4A.

Figure 5A:
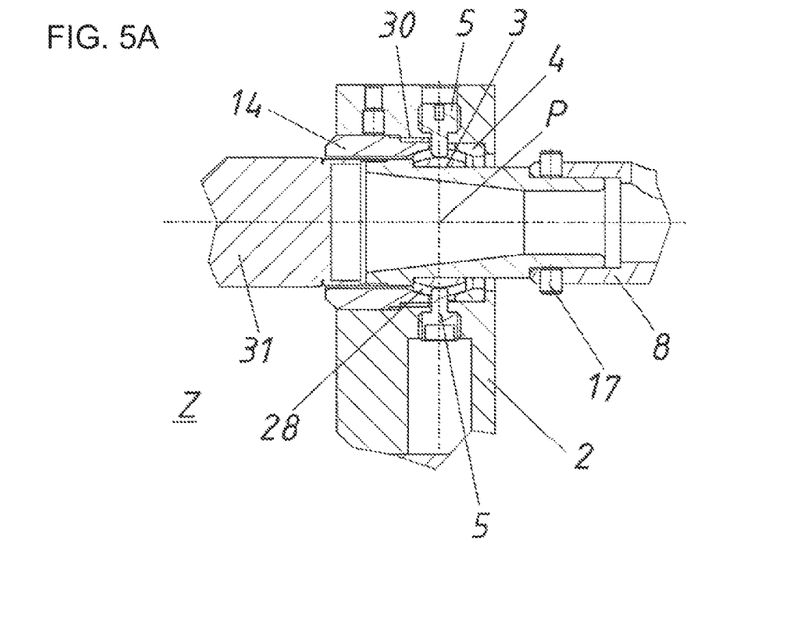
FIG. 5A is a diagrammatic, sectional view of detail 5A shown in FIG. 4A.

FIG. 5A shows in detail the region of the ball joint 22 in the front holding plate 2. The outer ring 14 is screwed by way of a thread 30 in the front holding plate 2. The inner ring 3 bears by way of its convex ball surface portion against the concave ball surface portions of the outer rings 14 and 4. The rotation-preventing bolt 5 engages into the grooves 28 in the inner ring 3, thereby permitting limited rotary movement of the inner ring 3 together with housing 20 about the pivot point P.

Figure 5B:
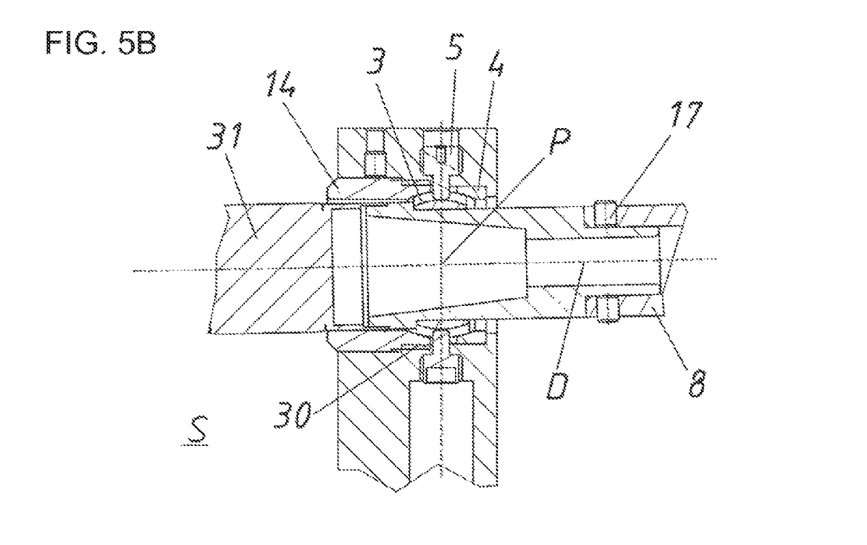
FIG. 5B is a diagrammatic, sectional view of detail 5B shown in FIG. 4B.

That rotation about the pivot point P is shown in FIG. 5B, wherein a maximum rotation about the pivot point P of on all sides at least 0.1 degree is allowed. It can also be provided that rotation about the pivot point P of over 30 degrees and even up to 90 degrees is possible. Preferably rotation in all directions about the pivot point between 0.5 and 4 degrees is possible by the ball joint 22. Preferably the axis of rotation D can be moved through about 2 degrees in all directions about the pivot point P (the maximum positions or outward deflection angles of the axis of rotation A thus describe a cone with a surface inclined through 2°). In that case the maximum yielding flexibility is limited on the one hand by the play between the machining head 6 and the outer ring 14 and on the other hand by the maximum positions of the return device 23.

Figure 6A:
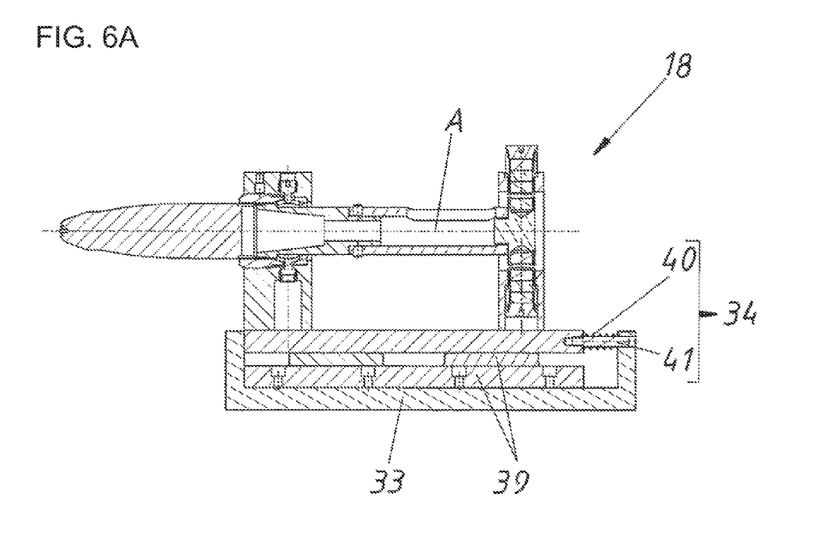
FIG. 6A is a diagrammatic, sectional view similar to FIG. 4A with a base element and a damping element.

FIG. 6A shows a section through the machining apparatus 8 together with the base element 33. The carrier plate 1 of the holding frame 21 is mounted movably, preferably slidably, parallel to the axis of rotation A, on the base element 33 of the holding device 35, by way of guide elements 39 preferably having rails.

Figure 6B:
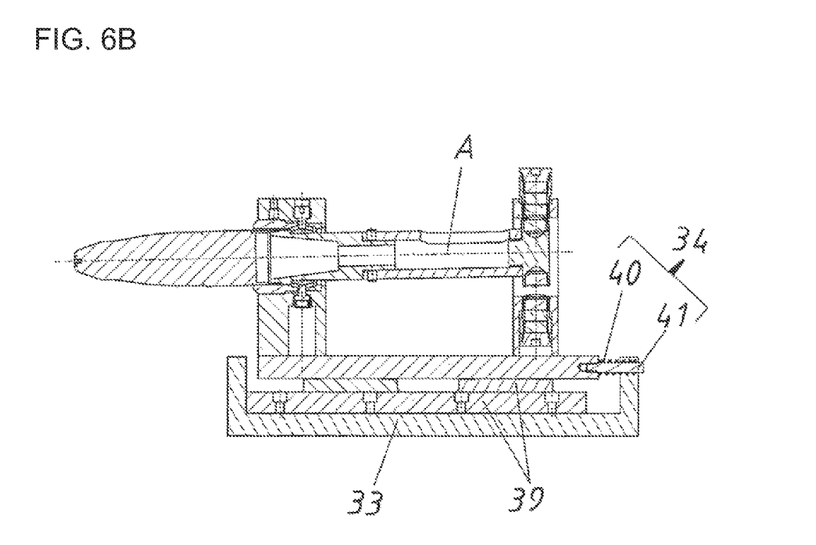
FIG. 6B is a diagrammatic, sectional view similar to FIG. 4B with the base element and the damping element.
Figure 7:
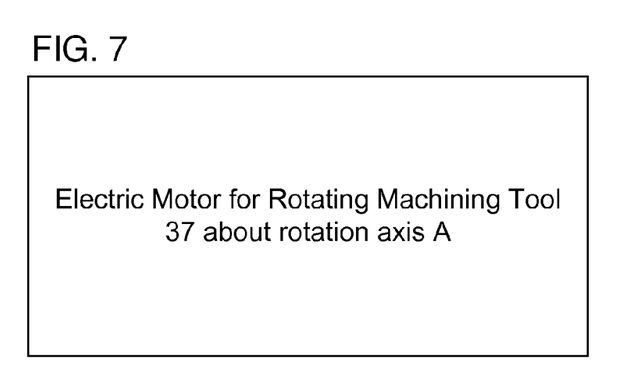
FIG. 7 is a schematic representation of the electric motor utilized to rotate the tool 37 about the axis A of rotation.
Figure 8:
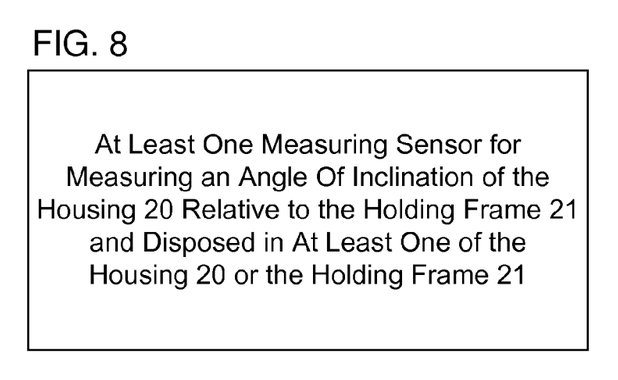
FIG. 8 is a schematic representation regarding the sensing arrangement.

If now pressure is also exerted on the machining tool 37 in the direction of the axis of rotation A the housing 20 with holding frame 21 is moved relative to the base plate 33. In that case a damping element 34 is compressed (see FIG. 6B). As soon as the pressure on the machining head 6 decreases again a spring 40 of the damping element 34 can expand again along a guide pin 41 and moves the entire holding frame 21 with the housing 20 back into the starting position shown in FIG. 6A.

Thus this invention provides a machining apparatus 18 for grinding or milling dental workpieces 19, in which incorrect machining operations on the workpiece 19 can be avoided by the housing 20 being mounted yieldingly movably on the holding device 35 of the machining apparatus 18.

The invention claimed is:

1. A machining apparatus for grinding, milling, or polishing of a dental workpiece, the machining apparatus comprising:
   a machining tool;
   a housing mounting said machining tool to a front end of the machining apparatus, said machining tool mounted rotatably for rotation relative to said housing about an axis of rotation;
   a holding device fixing said housing, said housing mounted yieldingly movably to said holding device in dependence on forces exerted on said machining tool, said holding device having a holding frame for holding said housing, said holding frame having a front holding plate, a rear holding plate spaced along the axis of rotation from the front holding plate, and a carrier plate to which said front and rear holding plates are fixed;
   a ball joint within an opening in the front holding plate, said housing mounted for movement about a pivot point with respect to said holding device by means of said ball joint so as to be movable, when a non-axial load is applied to the machining tool, to an orientation wherein the axis of rotation is not parallel to a longitudinal axis of the machining apparatus; and
   a return device for returning the axis of rotation to an orientation where the axis is parallel to the longitudinal axis of the machining apparatus when the non-axial load is removed from the machine tool, said return device being disposed in said rear holding plate, said housing mounted movably in said rear holding plate by way of said return device.

2. The machining apparatus according to claim 1, wherein said holding device has a base element to which said holding frame is mounted.

3. The machining apparatus according to claim 2, wherein said ball joint includes two outer rings and an inner ring.

4. The machining apparatus according to claim 2, wherein said holding frame is movably mounted for movement with respect to said base element substantially in a direction of the axis of rotation.

5. The machining apparatus according to claim 2, further comprising a damping element, wherein said holding frame together with said housing are mounted movably for movement with respect to said base element in a direction of the axis of rotation, which movement in the direction of the axis of rotation is damped by said damping element.

6. The machining apparatus according to claim 2, wherein: said housing is rotatably mounted for limited rotation by way of said ball joint.

7. The machining apparatus according to claim 2, wherein said return device is a magnetic return device disposed in said rear holding plate.

8. The machining apparatus according to claim 1, wherein said housing is rotatably mounted for limited rotation by way of said ball joint.

9. The machining apparatus according to claim 1, wherein said ball joint has an outer ring disposed in said holding frame of said holding device, and an inner ring disposed on said housing, said inner and outer rings having mutually corresponding ball surface portions.

10. The machining apparatus according to claim 1, wherein said return device is a magnetic return device.

11. The machining apparatus according to claim 10, wherein when the non-axial load is removed from said machining tool, said housing is held in a central position in said holding frame by said magnetic return device.

12. The machining apparatus according to claim 11, wherein when the non-axial load is exerted on said machining tool, said machining tool is rotatable together with said housing about the pivot point whereby said housing is movable from the central position into an inclined position against a force of said magnetic return device, and when said non-axial load is removed from said machining tool, said housing is movable into the central position by said magnetic return device.

13. The machining apparatus according to claim 1,
wherein said housing has a machining head; and
the machining apparatus further comprising an electric motor for driving said machining tool, the electric motor disposed in said machining head of said housing.

14. The machining apparatus according to claim 1, further comprising at least one measuring sensor for measuring an angle of inclination of said housing relative to said holding frame and disposed in at least one of said housing or in said holding frame.

15. The machining apparatus according to claim 1, wherein said ball joint has an outer ring disposed in said front holding plate of said holding frame of said holding device, and an inner ring disposed on said housing, said inner and outer rings having mutually corresponding ball surface portions.

16. A CAD-CAM machine for machining dental workpieces, comprising:
a machining apparatus according to claim 1.

* * * * *